(12) United States Patent
Keegan

(10) Patent No.: US 9,994,273 B1
(45) Date of Patent: Jun. 12, 2018

(54) MOTORCYCLE LIGHTING SYSTEMS

(71) Applicant: William J. Keegan, San Jose, CA (US)

(72) Inventor: William J. Keegan, San Jose, CA (US)

( * ) Notice: Subject to any disclaimer, the term of this patent is extended or adjusted under 35 U.S.C. 154(b) by 0 days. days.

(21) Appl. No.: 15/344,549

(22) Filed: Nov. 6, 2016

(51) Int. Cl.
| | |
|---|---|
| *B62J 6/00* | (2006.01) |
| *F21V 33/00* | (2006.01) |
| *B62J 6/16* | (2006.01) |
| *B62J 6/18* | (2006.01) |
| *B62K 11/02* | (2006.01) |
| *B62K 11/14* | (2006.01) |
| *B60Q 9/00* | (2006.01) |
| *B60Q 1/00* | (2006.01) |
| *B60Q 1/04* | (2006.01) |
| *B60Q 1/26* | (2006.01) |
| *B60Q 1/32* | (2006.01) |
| *B60Q 1/30* | (2006.01) |

(52) U.S. Cl.
CPC .............. *B62J 6/00* (2013.01); *B60Q 1/0076* (2013.01); *B60Q 1/0408* (2013.01); *B60Q 1/2619* (2013.01); *B60Q 1/2696* (2013.01); *B60Q 1/32* (2013.01); *B60Q 9/008* (2013.01); *B62J 6/16* (2013.01); *B62J 6/18* (2013.01); *B62K 11/02* (2013.01); *B62K 11/14* (2013.01); *B60Q 1/30* (2013.01); *B60Q 2400/20* (2013.01); *B62J 2300/0046* (2013.01)

(58) Field of Classification Search
CPC ......... B62J 6/00; B62J 6/16; B62J 6/18; B62J 2300/0046; B62K 11/14; B62K 11/02; B60Q 1/30; B60Q 1/0076; B60Q 1/32; B60Q 1/2696; B60Q 1/2619; B60Q 1/0408; B60Q 9/008; B60Q 2400/20

USPC .................................................. 362/473, 474
See application file for complete search history.

(56) References Cited

U.S. PATENT DOCUMENTS

| | | | | |
|---|---|---|---|---|
| 5,375,677 A | * | 12/1994 | Yamagiwa | B62K 11/04 180/219 |
| 9,539,483 B1 | * | 1/2017 | Tsang | A63B 69/0048 |
| 2003/0020627 A1 | * | 1/2003 | Vukosic | G08B 5/36 340/815.45 |
| 2006/0290094 A1 | * | 12/2006 | Kamalian | B62K 11/04 280/274 |
| 2009/0080207 A1 | * | 3/2009 | Hurwitz | B60Q 1/2615 362/464 |
| 2009/0108560 A1 | * | 4/2009 | Mountz | B62J 25/00 280/291 |
| 2009/0180278 A1 | * | 7/2009 | Cheng | A42B 3/044 362/106 |

(Continued)

FOREIGN PATENT DOCUMENTS

GB                    668803 A    *    3/1952    ............. B62J 6/005

*Primary Examiner* — Anh Mai
*Assistant Examiner* — Glenn Zimmerman
(74) *Attorney, Agent, or Firm* — RG Patent Consulting, LLC; Rachel Gilboy

(57) ABSTRACT

A motorcycle lighting system including a plurality of LED light members fixedly embedded within hollow frame members of a motorcycle, a series of wires attached to respective light members and threaded through the interior of the hollow frame members and connected with control members attached to the handle bars of the motorcycle frame such that a rider can control the color and flashing sequences of the light members when in use. The frame can include any known and usual parts including highway bars.

13 Claims, 3 Drawing Sheets

(56) References Cited

U.S. PATENT DOCUMENTS

| | | | |
|---|---|---|---|
| 2009/0323368 A1* | 12/2009 | Campbell | B60Q 1/2661 |
| | | | 362/474 |
| 2012/0221205 A1* | 8/2012 | Ichida | B62J 99/00 |
| | | | 701/37 |
| 2015/0173151 A1* | 6/2015 | Ter Weeme | H05B 33/0863 |
| | | | 315/294 |
| 2015/0338043 A1* | 11/2015 | Desai | F21S 48/115 |
| | | | 362/516 |
| 2016/0193958 A1* | 7/2016 | Smith | B60Q 1/28 |
| | | | 362/473 |

* cited by examiner

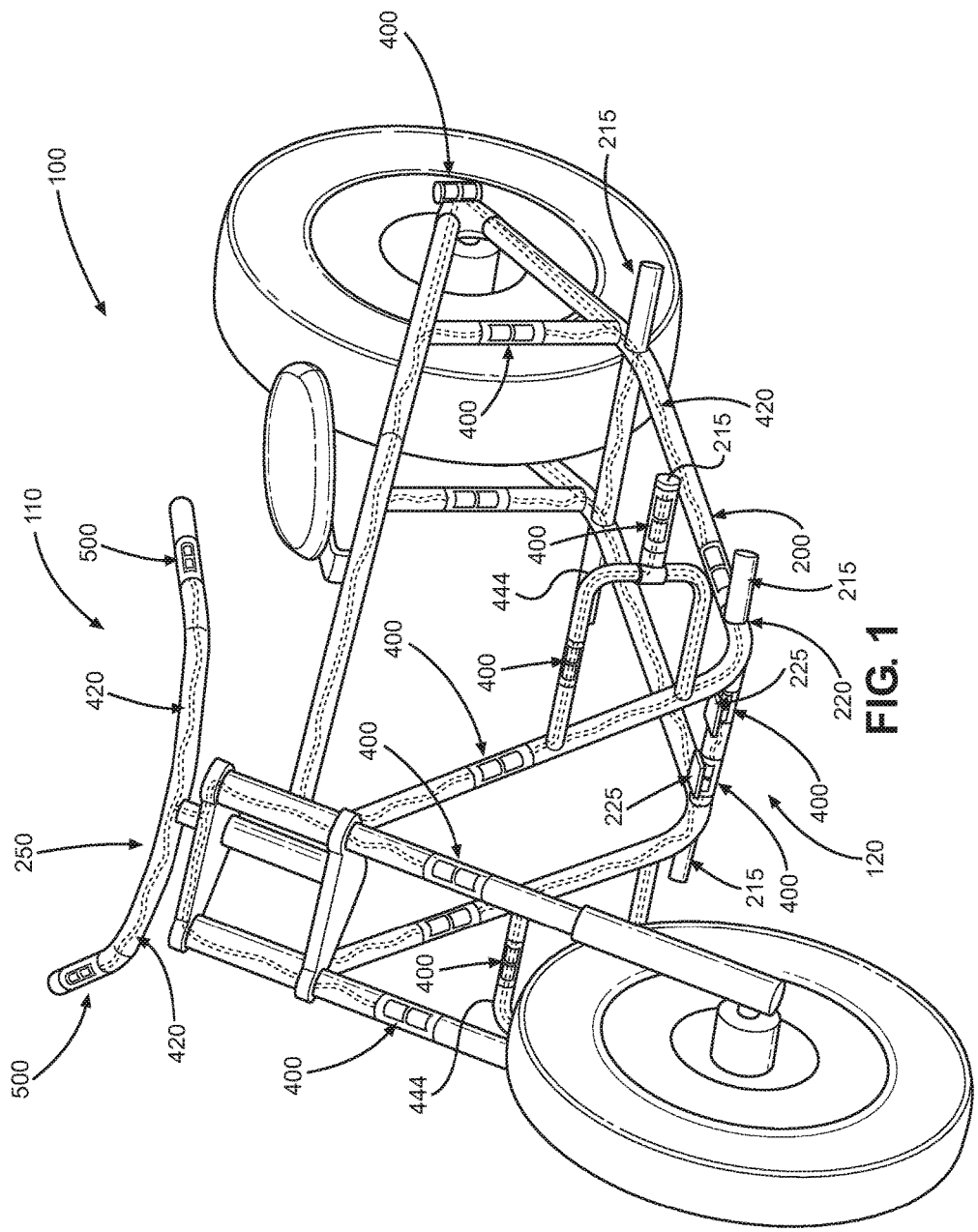

MOTORCYCLE LIGHTING SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of safety lighting for motorcycles and other wheeled vehicles.

DESCRIPTION OF THE RELATED ART

When riding a motorcycle one of the main concerns is that other motorists can see you and maintain a safe distance from you. The most effective way to make one's motorcycle more visible is to add lights to the frame and includes control mechanisms to light them in various colors and sequences. The preexisting methods and systems rely on attachment means between the light members, wires, and the frame members of the vehicle. The downsides to these methods and systems include the lights migrating upon the frame members over time due to vibrations caused by the engine and road conditions during travels and thereby not projecting the lights in the desired directions, and the wires being exposed to weather elements, road dirt, and accidental contact by a rider thereby corroding and/or damaging them.

Various attempts have been made to solve the above-mentioned problems such as those found in U.S. Pat. No. 4,797,791 to Burchick; U.S. Pat. No. 6,354,723 to Spence; and U.S. Pat. No. 6,789,927 to Tracey. This art is representative of motorcycles incorporating lighting apparatuses. None of the above inventions and patents, taken either singly or in combination, is seen to describe the invention as claimed.

BRIEF SUMMARY OF THE INVENTION

In view of the foregoing disadvantages inherent in the known art, the present invention provides a novel motorcycle lighting system. The general purpose of the present invention, which will be described subsequently in greater detail, is to provide a motorcycle lighting system designed to be more reliable and durable.

The motorcycle lighting system includes a plurality of LED light members fixedly embedded within hollow frame members of a motorcycle, a series of wires attached to respective light members and threaded through the interior of the hollow frame members and connected with control members attached to the handle bars of the motorcycle frame, such that a rider can control the color and flashing sequences of the light members when in use.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention constructed and operative according to the teachings of the present invention.

FIG. 1 shows a perspective view illustrating a motorcycle and frame incorporating a lighting system according to an embodiment of the present invention.

The various embodiments of the present invention will hereinafter be described in conjunction with the appended drawings, wherein like designations denote like elements.

DETAILED DESCRIPTION

As discussed above, embodiments of the present invention relate to a motorcycle lighting system includes a plurality of LED light members fixedly embedded within hollow frame members of a motorcycle, a series of wires attached to respective light members and threaded through the interior of the hollow frame members and connected with control members attached to the handle bars of the motorcycle frame, such that a rider can control the color and flashing sequences of the light members when in use.

Figure 2A:
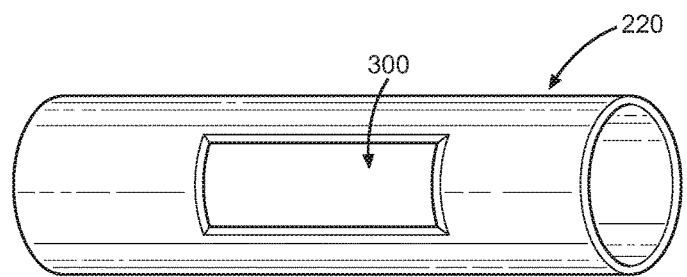
FIG. 2a shows a perspective view illustrating a tubular frame member with openings therein to receive wires and a light member, according to the embodiment of FIG. 1.
Figure 2B:
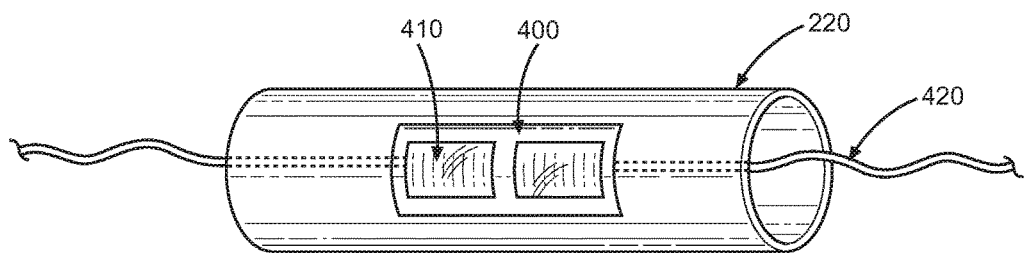
FIG. 2b shows a perspective view illustrating a tubular frame member with wires and a light member attached thereto and therein, according to the embodiment of FIG. 1.
Figure 3:
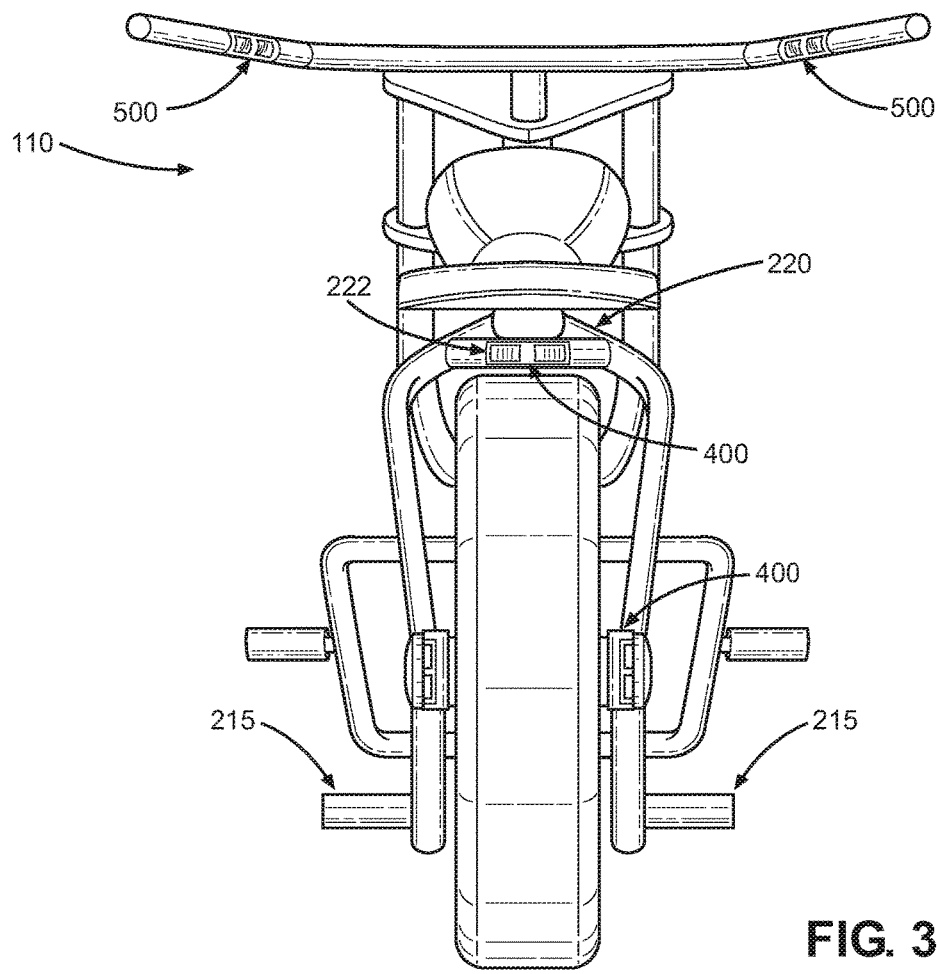
FIG. 3 shows a back view illustrating the motorcycle and frame, according to the embodiment of FIG. 1.
Figure 4:
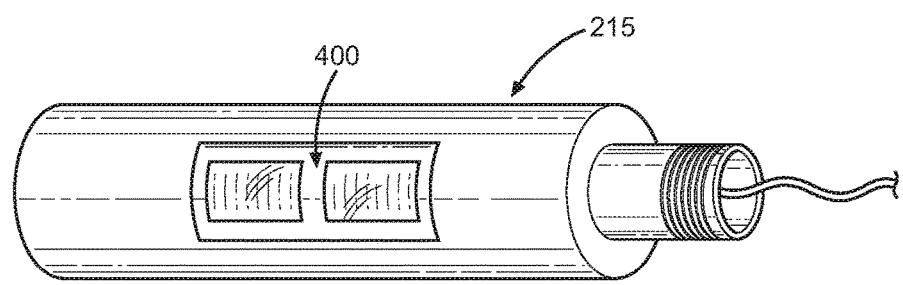
FIG. 4 shows a perspective view illustrating a foot peg member with wires and a light member attached thereto and therein, according to the embodiment of FIG. 1.

Referring now to FIGS. 1-4, a combination 100 of a motorcycle 110 and a motorcycle lighting system 120 is disclosed comprising of a motorcycle 110 including a frame 200 including tubular frame members 220 having a plurality of openings 300 therein adapted to securely hold and retain light members 400 therein, handle bar members 250 pivotally connected to the frame and are adapted to be used to steer the motorcycle 110, and a motorcycle lighting system 120 comprising a plurality of light members 400 securely attached to respective plurality of openings 300 within the tubular frame members 220 of the frame 200, a plurality of wires 420 attached to respective light members 400 and threaded through the hollow interior of the tubular frame members 220 and adapted to be connected to control members 500 attached to the handle bars of the motorcycle frame, and a plurality of control members 500 connected to respective handle bar members 250 and respectively connected to the plurality of wires 420 and adapted to control the color and flashing sequences of the plurality of light members 400 when in use.

The plurality of light members 400 are formed as LED light members and are formed and adapted to emit colors including red, white, and blue. The LED light members may further include lenses 410 that are adapted to focus the light from the LED light members into directional light beams, and which can also focus the light from the LED light members into two directional light beams, wherein one of the two directional light beams being a high beam and one of the two directional light beams being a low beam, and wherein the plurality of control members 500 are adapted to control both the high and low light beams and choose which of the high and low light beams are turned on or turned off at any given time period.

The plurality of control members 500 are adapted such that a user can choose to intermittently light up a series of lights of one color at a chosen interval, and wherein a user can choose to intermittently light up a series of lights of one color at one set of intervals and a series of lights of a differing color at a second set of intervals, such that the motorcycle lighting system appears to flash back and forth between two colors.

The motorcycle frame 200 may further include highway bars 444, wherein a portion of each said highway bar includes at least one opening having a light member attached therein. Further, motorcycle frame 200 may further include hollow foot peg members 215 releasably attached thereto having openings therein adapted to receive at least one light member and at least one wire therein. The motorcycle frame 200 may also include foot rest portions 225 that include at least one opening 300 having a light member 400 attached therein. The frame also includes a rear facing portion 222 including at least one opening 300 having a light member 400 attached therein as well. The frame 200 may be formed from a material chosen from a group of materials consisting of steel, stainless steel, and ceramic.

The handle bars 250 are also formed as hollow tubes and each include an opening 300 having a light member 400 attached therein adapted to be connected via wires to one of the plurality of control members.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. A combination of a motorcycle and a motorcycle lighting system, comprising:
  a motorcycle including:
    a frame including:
      hollow tubular frame members having a plurality of openings therein adapted to securely hold and retain light members therein;
      handle bar members;
        wherein said handle bar members are pivotally connected to said frame and are adapted to be used to steer said motorcycle; and
  a motorcycle lighting system comprising:
    a plurality of light members;
      wherein said plurality of light members are securely attached to respective said plurality of openings within said tubular frame members of said frame;
    a plurality of wires;
      wherein said plurality of wires are threaded through the hollow interior of said tubular frame members, are attached to respective said plurality of light members, and adapted to be connected to control members attached to said handle bars of said motorcycle frame; and
    a plurality of control members;
      wherein said plurality of control members are connected to respective said handle bar members and respectively connected to said plurality of wires and adapted to control the color and flashing sequences of said plurality of light members when in use.

2. The combination of claim 1, wherein said plurality of light members are LED light members.

3. The combination of claim 1, wherein said motorcycle frame further includes hollow foot peg members releasably attached thereto having openings therein adapted to receive at least one said light member and at least one said wire therein.

4. The combination of claim 1, wherein said frame includes foot rest portions; and wherein a front portion of each said foot rest portion include at least one said opening having a light member attached therein.

5. The combination of claim 1, wherein each of said handle bar members are formed as a hollow tube and includes an opening having a light member attached therein adapted to be connected via said wires to one of said plurality of control members.

6. The combination of claim 1, wherein said frame includes a rear facing portion including at least one said opening having a light member attached therein.

7. The combination of claim 1, wherein said frame includes highway bars; and wherein a portion of each said highway bar includes at least one said opening having a light member attached therein.

8. The combination of claim 1, wherein said frame is formed from a material chosen from a group of materials consisting of steel, stainless steel, and ceramic.

9. The combination of claim 2, wherein said LED light members are formed and adapted to emit colors chosen from a group of colors consisting of red, white, and blue.

10. The combination of claim 2, wherein said LED light members include lenses adapted to focus the light from said LED light members into directional light beams.

11. The combination of claim 9, wherein said plurality of control members are adapted such that a user can choose to intermittently light up a series of lights of one color at a chosen interval.

12. The combination of claim 9, wherein said plurality of control members are adapted such that a user can choose to intermittently light up a series of lights of one color at one set of intervals and a series of lights of a differing color at a second set of intervals, such that the motorcycle lighting system appears to flash back and forth between two colors.

13. The combination of claim 10, wherein said LED light members lenses are adapted to focus said light from said LED light members into two directional light beams, one of said two directional light beams being a high beam and one of said two directional light beams being a low beam; and wherein said plurality of control members are adapted to control both said high and low light beams and choose which of said high and low light beams are turned on or turned off.

\* \* \* \* \*